2,712,011

3-SULFONAMIDO-6-CHLOROPYRIDAZINES AND PROCESSES OF PREPARING SAME

Margaret M. Rogers and Jackson P. English, Stamford, Conn., assignors to American Cyanamid Company, New York, N. Y., a corporation of Maine No Drawing. Application December 24, 1953, Serial No. 400,376

7 Claims. (Cl. 260—239.7)

This invention relates to p-substituted benzenesulfonamido-6-chloropyridazines and to methods of preparing the same.

In our copending application, Serial No. 233,100, filed June 22, 1951, now U. S. Patent Number 2,671,086, issued March 2, 1954, the preparation of 3,6-dichloropyridazine is described. This application also shows that the compound is useful as an intermediate for the preparation of various other organic compounds including the new compound 3-sulfanilamido-6-chloropyridazine, which in turn, may be converted to 3-sulfanilamidopyridazine.

In U. S. Patent No. 2,371,115, issued March 6, 1945, a number of p-substituted benzene sulfonamidopyridazines are described, which have chemotherapeutic activity and are valuable intermediates for the production of azo dyes of extraordinary light fastness. Several methods of preparing sulfanilamidopyridazines are referred to in that patent. Unfortunately, however, the yields that are obtained are low, only about 15 per cent in the last step, and several preceding steps are necessary. Because of this, the commercial development of sulfanilamidopyridazine for its several purposes has been retarded.

We have discovered that the compound 3,6-dichloropyridazine, which is disclosed and claimed in our aforesaid prior application, can be made to react with sulfanilamide and N⁴-acylsulfanilamides to yield (p-substituted benzenesulfonamido)-6-chloropyridazines with very good yields, and further, these new compounds can be dechlorinated very readily to yield (p-substituted benzenesulfonamido) pyridazines. The (p-acylaminobenzenesulfonamido)-6-chloropyridazines can be readily deacylated by hydrolysis to yield 3-sulfanilamido-6-chloropyridazines. The new compound 3-sulfanilamido-6-chloropyridazine possesses therapeutic activity and is useful in the synthesis of other organic compounds, for example, it is an intermediate for the preparation of the known sulfanilamidopyridazine.

In preparing the compounds of the present invention, 3,6-dichloropyridazine is obtained preferably by the process of our Patent Number 2,671,086, issued March 2, 1954. A method of preparing this compound will be described in the examples hereinafter. The 3,6-dichloropyridazine need not be of a specially high purity in view of subsequent purification steps. It is reacted with sulfanilamide or p-acetylaminobenzene sulfonamide by heating at a temperature of 130° C.–220° C. in the presence of an acid acceptor, such as potassium carbonate. The presence of a solvent is not necessary, although high boiling inert solvents, such as the simple hydrocarbons or chlorinated hydrocarbons, may be used if desired.

When using an alkali carbonate as an acid acceptor, the beginning of the reaction will be noted by the evolution of carbon dioxide. The reaction is exothermic and takes place very rapidly once the reaction temperature has been reached. Recovery of the benzenesulfonamido-6-chloropyridazine is readily accomplished by methods such as are described in the examples.

When used as an intermediate for conversion to sulfanilamidopyridazine, the crude product may be used and the chlorine removed by reduction as shown in the examples or by other reducing agents.

The unusual reactivity of 3,6-dichloropyridazine by which one chlorine readily reacts with the amino group of sulfanilamide to yield 3-sulfanilamido-6-chloropyridazine is considered surprising and enables us to readily prepare 3-sulfanilamido-6-chloropyridazine, a useful compound in its own right, or allows us to proceed to the preparation of sulfanilamidopyridazine by removal of the chlorine atom on the pyridazine ring to yield directly the valuable compound 3-sulfanilamidopyridazine.

To illustrate the invention in greater particularity, the following examples are given. All parts are by weight unless otherwise indicated.

*Example I*

A slurry of one part of maleic hydrazide in 7.1 parts of phosphorus oxychloride is stirred for fifteen minutes at room temperature and then heated to 90° C. Heating is discontinued at this point, as the heat of reaction is sufficient to maintain the reaction at this temperature. After about twenty minutes the reaction is substantially complete, and excess phosphorus oxychloride is removed by vacuum distillation. The resulting oily residue is drowned in ice water, which results in the appearance of a copious tan precipitate. This mixture is made alkaline by the gradual addition of concentrated ammonium hydroxide, and the mixture is then extracted to exhaustion with ether. The ether solution is dried by treatment for about sixteen hours with calcium sulfate at 8° C. and is then filtered and concentrated to a small volume by evaporation of solvent. The remaining concentrated solution is distilled in a vacuum and a fraction boiling at 123° C. to 127° C. at 8 mm. pressure is collected. This 3,6-dichloropyridazine has a melting point of about 66° C. to 68° C.

*Example II*

1.9 parts of 3,6-dichloropyridazine, 3.4 parts of sulfanilamide, 2.7 parts of potassium carbonate and 1 part of sodium chloride were ground together. The solid mixture was heated with stirring in a wax bath in a round-bottom flask fitted with reflux condenser. As the dichloropyridazine and sulfanilamide melted, the mixture became a slurry. When the bath temperature had reached 140° C. a sudden evolution of $CO_2$ occurred which lasted about five minutes, after which the mixture set in fine granules. When no more $CO_2$ was evolved, the wax bath was removed, and the reaction mixture was heated in sufficient water to dissolve and allowed to cool. Unreacted sulfanilamide was collected by filtration. Excess dichloropyridazine was removed from the filtrate by ether extraction. The basic solution was chilled and poured into one-half volume of 1:3 acetic acid. Sufficient hydrochloric acid was added to bring the mixture to pH 4. The crude 3-sulfanilamido-6-chloropyridazine which precipitated was purified by solution in 6 parts of 1:100 ammonium hydroxide, charcoal treatment and precipitation by pouring of the filtrate into dilute acetic acid. This new compound has been found to have physiological activity.

In place of the potassium carbonate used above, it is possible to employ other acid acceptor substances such as sodium carbonate, barium carbonate, sodium bicarbonate, and the like. Other basic substances such as sodium hydroxide, potassium hydroxide may be used but, however, with not such efficient results in view of the tendency of these substances to react with the dichloropyridazine.

As noted, one of the principal advantages of the invention is that the compound 3-sulfanilamido-6-chloropyridazine is readily converted to 3-sulfanilamidopyridazine by reduction. An example of this will now be given.

*Example III*

A solution of 1.5 parts of 3-sulfanilamido-6-chloropyridazine in 1 part of 40% sodium hydroxide and 4 parts of water was shaken under an atmosphere of hydrogen for one hour with 0.15 part of 10% platinum-charcoal catalyst and 0.15 part of 10% palladium-charcoal catalyst. The solution was filtered free of catalyst and poured into 3 volumes of 1:8 acetic acid. Product precipitated amounting to 53% of theoretical yield. Additional product was obtained by leaching of the catalyst. These crude materials were purified by heating fifteen minutes with decolorizing carbon in a solution of 20 volumes of 1:100 ammonium hydroxide and precipitation of the filtrate by pouring into acetic acid solution. Total recovery of material melting 187° C. to 188° C. was 86% of theory. This 3-sulfanilamidopyridazine is a known compound which has been previously reported as having sulfanilamide activity.

*Example IV*

4.3 parts $N^4$-acetylsulfanilamide, 2.1 parts dichloropyridazine, 2.8 parts of potassium carbonate, and 1.0 part of sodium chloride were ground together and heated gently, with stirring. When temperature reached 170° C. an evolution of $CO_2$ occurred and then the mixture set to a hard mass. The mixture was dissolved in sufficient water and allowed to cool. Unreacted $N^4$-acetylsulfanilamide was recovered by filtration and excess dichloropyridazine was removed from the filtrate by ether extraction. The basic solution was chilled and acidified slowly with 1:3 acetic acid to pH 4. The crude 3-$N^4$-acetylsulfanilamido-6-chloropyridazine which precipitated was purified by solution in 6 parts 1:100 ammonium hydroxide, charcoal treatment and precipitation by acidifying filtrate with 1:3 acetic acid.

*Example V*

1 part 3-$N^4$-acetylsulfanilamido-6-chloropyridazine was refluxed with 0.26 part sodium hydroxide and 2.6 parts water for 30 minutes. The solution was chilled and acidified slowly with dilute acetic acid until precipitation was complete. The crude 3-sulfanilamido-6-chloropyridazine, which precipitated, was purified by dissolving in 6 parts ammonium hydroxide, treating with charcoal and precipitation with dilute acetic acid.

*Example VI*

A solution of 1.5 parts of 3-$N^4$-acetylsulfanilamido-6-chloropyridazine in 1 part of 40% sodium hydroxide and 4 parts of water was shaken under a hydrogen atmosphere for one hour with 0.15 part of 10% platinum-charcoal catalyst and 0.15 part of 10% palladium-charcoal catalyst. The solution was filtered free of catalyst and poured into 5 volumes 1:3 acetic acid to precipitate the 3-$N^4$-acetylsulfanilamidopyridazine.

*Example VII*

1 part 3-$N^4$-acetylsulfanilamidopyridazine was dissolved in 10 parts 10% NaOH and 2 parts water and heated in a boiling water bath for 30 minutes. The solution was chilled and acidified slowly with 1:3 acetic acid. The 3-sulfanilamidopyridazine which formed was filtered off.

We claim:

1. Compounds of the group consisting of 3-$N^4$-acylsulfanilamido-6-chloropyridazines and 3-sulfanilamido-6-chloropyridazine.
2. 3-$N^4$-acetyl sulfanilamido-6-chloropyridazine.
3. 3-sulfanilamido-6-chloropyridazine.
4. A method of preparing compounds of the group consisting of 3-$N^4$-acyl-sulfanilamido-6-chloropyridazine and 3-sulfanilamido-6-chloropyridazine, which comprises the step of heating together compounds of the group consisting of sulfanilamide and $N^4$-acyl-sulfanilamide and with a 3,6-dichloropyridazine and an acid acceptor.
5. A method of preparing 3-sulfanilamido-6-chloropyridazine which comprises the step of heating together 3,6-dichloropyridazine, sulfanilamide and an acid acceptor.
6. A method of preparing 3-sulfanilamido-6-chloropyridazine which comprises the step of heating together 3,6-dichloropyridazine, sulfanilamide and potassium carbonate.
7. A method of preparing 3-sulfanilamido-6-chloropyridazine which comprises the step of heating together 3,6-dichloropyridazine and sulfanilamide to a temperature of at least 130° C. in the presence of an acid acceptor of the group consisting of carbonates and bicarbonates of metals.

References Cited in the file of this patent

UNITED STATES PATENTS

| | | |
|---|---|---|
| 2,371,115 | Winnek et al. | Mar. 6, 1945 |
| 2,533,033 | Moore | Dec. 5, 1950 |
| 2,671,086 | Rogers et al. | Mar. 2, 1954 |